United States Patent
Wu et al.

(10) Patent No.: US 12,316,108 B2
(45) Date of Patent: May 27, 2025

(54) HYBRID POWER SUPPLY SYSTEM AND METHOD OF EXTENDING POWER SUPPLY TIME OF SECONDARY BATTERY THEREOF

(71) Applicant: C.T.I. TRAFFIC INDUSTRIES CO., LTD., Tainan (TW)

(72) Inventors: Fang-Che Wu, Tainan (TW); Chun-Hsiung Chen, Tainan (TW)

(73) Assignee: C.T.I. Traffic Industries Co., Ltd., Tainan (TW)

(*) Notice: Subject to any disclaimer, the term of this patent is extended or adjusted under 35 U.S.C. 154(b) by 64 days.

(21) Appl. No.: 18/492,947

(22) Filed: Oct. 24, 2023

(65) Prior Publication Data

US 2024/0154410 A1 May 9, 2024

(30) Foreign Application Priority Data

Nov. 7, 2022 (TW) .................................. 111142446

(51) Int. Cl.
*H02J 1/10* (2006.01)
*H02J 7/00* (2006.01)
*H02J 7/02* (2016.01)

(52) U.S. Cl.
CPC ........ *H02J 1/102* (2013.01); *H02J 7/007182* (2020.01); *H02J 7/02* (2013.01)

(58) Field of Classification Search
CPC ......... H02J 1/102; H02J 7/007182; H02J 7/02
See application file for complete search history.

(56) References Cited

U.S. PATENT DOCUMENTS

| | | | |
|---|---|---|---|
| 8,232,679 B2* | 7/2012 | Bobb ...................... | H02J 9/062 307/85 |
| 8,803,361 B2* | 8/2014 | Johansen ................ | H02J 9/062 307/64 |

FOREIGN PATENT DOCUMENTS

CN 112531714 A 3/2021

* cited by examiner

*Primary Examiner* — Carlos Amaya
(74) *Attorney, Agent, or Firm* — Rosenberg, Klein & Lee

(57) ABSTRACT

A hybrid power supply system and a method for extending a power supply time of a secondary battery thereof are provided. The method comprises: a detection unit detecting the magnitude of a load and outputting it to a control unit; wherein when a mains electricity is normal during peak hours, an initial alternating current from the mains electricity is input to a silicon-controlled rectifier, the silicon-controlled rectifier outputs a rectified alternating current, the rectified alternating current is converted into a first direct current to be output an inverter; a control unit controlling a secondary battery to output a second direct current to the inverter during a power supply time according to the magnitude of the load; the first direct current and the second direct current being respectively converted by the inverter and supplied to the load, thereby extending the power supply time of the second battery.

9 Claims, 8 Drawing Sheets

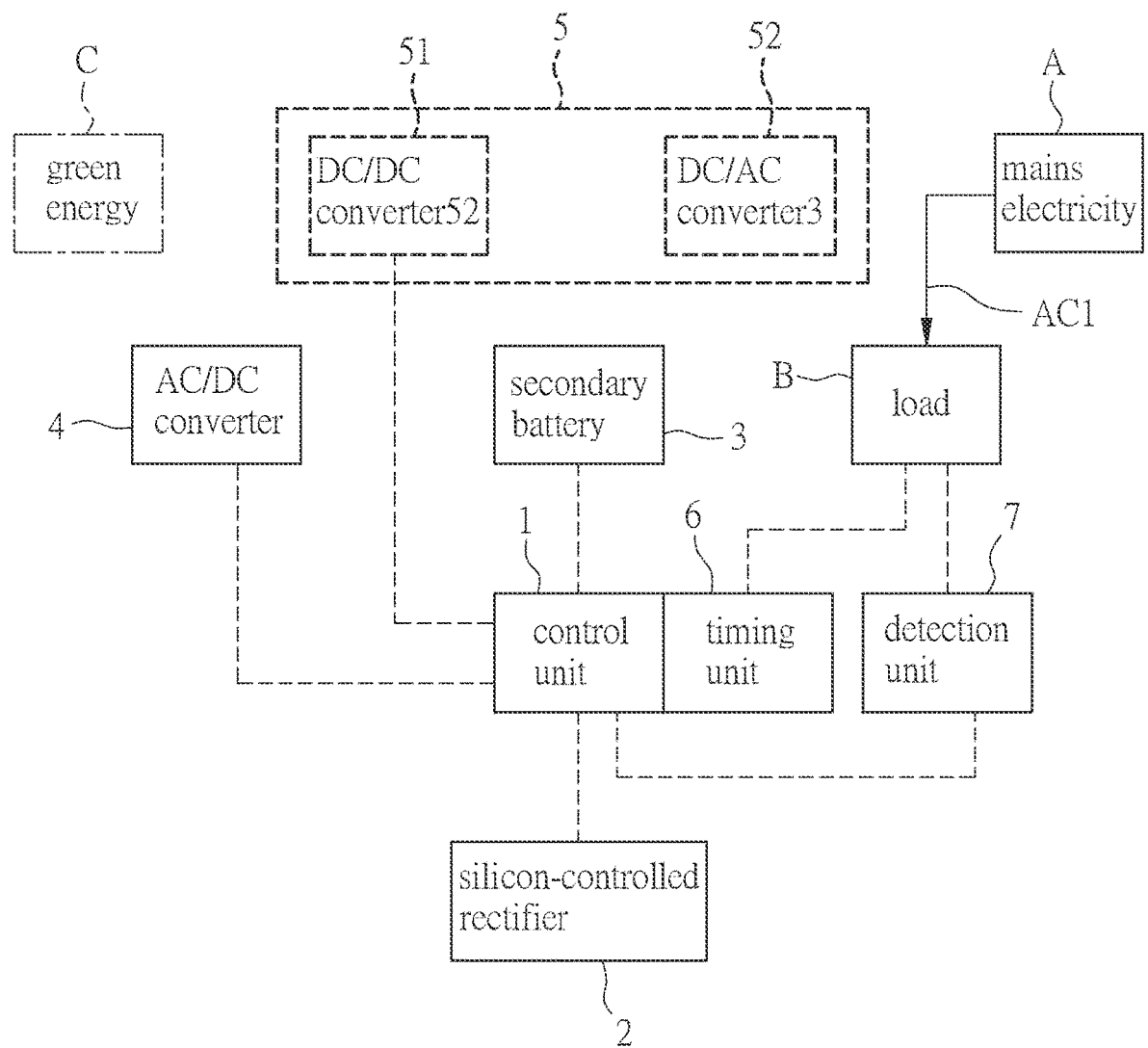
F I G . 5

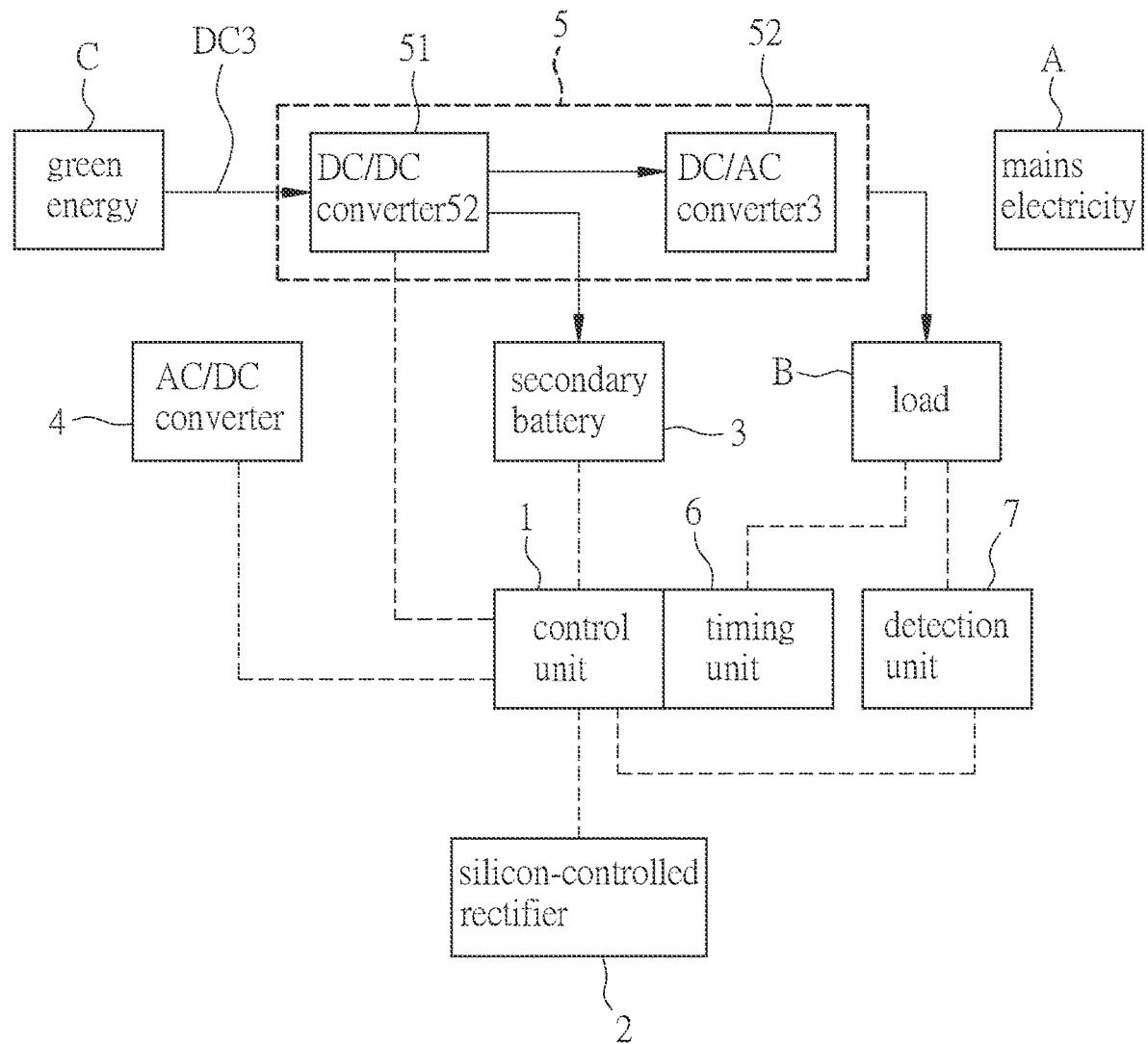
F I G . 6

HYBRID POWER SUPPLY SYSTEM AND METHOD OF EXTENDING POWER SUPPLY TIME OF SECONDARY BATTERY THEREOF

FIELD OF THE INVENTION

The present invention relates to a hybrid power supply system and a method of extending the power supply time of a secondary battery in the hybrid power supply system.

BACKGROUND OF THE INVENTION

In a hybrid power supply system, power supply is stabilized by switching between mains electricity and secondary batteries, or even renewable energy.

Specifically, for example, Chinese Patent Publication No. CN112531714A discloses an AC and DC hybrid power supply system for a 5G micro base station, comprising an AC and DC power supply system, a remote power monitoring system, and a power supply detection system. The AC and DC power supply system adopts the combination of mains electricity and new energy supply. The unit monitoring controller realizes the coordinated distribution of the two power supply circuits through the control signals to meet the power supply demands of each sub-system. The power supply detection system consists of a power detection module that communicates with the unit monitoring controller via an RS485 interface. The remote power monitoring system includes a wireless communication module and a terminal server. The output end of the unit monitoring controller is connected to the wireless communication module. The sender of the wireless communication module is wirelessly connected to the terminal server. The terminal server obtains the data and working status of the power system in real time.

The aforementioned patent applies environmentally friendly and energy-saving energy to the 5G micro-base station, breaking the situation where mains electricity is the only source of power supply and effectively solving the situation where solar energy cannot be used due to prolonged cloudy and rainy weather.

However, the aforementioned patent only allows for the choice of a battery or mains electricity. If a battery is selected, the power of the battery will be consumed quickly. Once the power of the battery is used up during peak hours, it will only be able to supply power from the mains electricity, increasing the burden of the mains electricity during peak hours.

SUMMARY OF THE INVENTION

According to one aspect of the present invention, a method for extending a power supply time of a secondary battery in a hybrid power supply system is provided. The method comprises: a detection unit detecting the magnitude of a load and outputting it to a control unit; wherein when a mains electricity is normal during peak hours, an initial alternating current from the mains electricity is input to a silicon-controlled rectifier, the silicon-controlled rectifier outputs a rectified alternating current to a AC/DC converter, and then the AC/DC converter outputs a first direct current to an inverter, the ratio between an average voltage of a work cycle of the rectified alternating current and an average voltage of a work cycle of the initial alternating current is defined as a conversion ratio, the control unit controls the conversion ratio between 0% and 100% depending on the magnitude of the load; the control unit controlling a secondary battery to output a second direct current to the inverter during a power supply time according to the magnitude of the load; the first direct current and the second direct current being respectively converted by the inverter and supplied to the load.

According to another aspect of the present invention, a hybrid power supply system is provided. The hybrid power supply system comprises: a control unit; a secondary battery, being in signal communication with the control unit; a silicon-controlled rectifier, being in signal communication with the control unit; an AC/DC converter, being in signal communication with the control unit, the AC/DC converter being electrically connected to the silicon-controlled rectifier; an inverter, being in signal communication with the control unit, the inverter being electrically connected to the AC/DC converter and the secondary battery; and a detection unit, being in signal communication with the control unit, the detection unit detecting the magnitude of a load and outputting it to the control unit. When a mains electricity is normal during peak hours, an initial alternating current from the mains electricity is input to the silicon-controlled rectifier, the silicon-controlled rectifier outputs a rectified alternating current to the AC/DC converter, and then the AC/DC converter outputs a first direct current to the inverter. The ratio between an average voltage of a work cycle of the rectified alternating current and an average voltage of a work cycle of the initial alternating current is defined as a conversion ratio. The control unit controls the conversion ratio between 0% and 100% depending on the magnitude of the load. The control unit controls the secondary battery to output a second direct current to the inverter during a power supply time according to the magnitude of the load. The first direct current and the second direct current are respectively converted by the inverter and supplied to the load.

Preferably, when the mains electricity is abnormal, the mains electricity does not output the initial alternating current, the control unit controls the secondary battery to output the second direct current to the inverter during the power supply time according to the magnitude of the load, and the second direct current is converted by the inverter and supplied to the load.

Preferably, when the inverter is abnormal, the initial alternating current of the mains electricity is directly supplied to the load.

Preferably, a green energy is provided. When a green energy direct current output by the green energy exceeds a first threshold, but does not exceed a second threshold, the green energy outputs the green energy direct current to the inverter. The green energy direct current is converted by the inverter and supplied to the load.

Preferably, when a green energy direct current output by the green energy exceeds a second threshold, the green energy outputs the green energy direct current to the inverter. The green energy direct current is converted by the inverter and supplied to the load and the secondary battery.

Preferably, during off-peak hours, the mains electricity outputs the initial alternating current to the inverter, the initial alternating current is converted by the inverter and supplied to the secondary battery, and the initial alternating current of the mains electricity is directly supplied to the load.

Preferably, a timing unit is in signal communication with the control unit. The control unit calculates a designated power supply time via the timing unit and controls the secondary battery to output the second direct current during the designated power supply time, and the control unit controls the conversion ratio according to the designated power supply time and the magnitude of the load.

Preferably, the inverter includes a DC/DC converter and a DC/AC converter. The first direct current is supplied to the load after being converted by the AC/DC converter, the DC/DC converter and the DC/AC converter. The second direct current is converted by the DC/AC converter and then supplied to the load.

According to the above technical features, the following effects can be preferably achieved:

1. The mains electricity and the secondary battery supply power together to the load during peak hours. The initial alternating current from the mains electricity passes through the silicon-controlled rectifier and the AC/DC converter to output a first direct current. The first direct current is like a simulated green energy. After the first direct current and the second direct current of the secondary battery are input together to the inverter, the inverter supplies power to the load, which can effectively extend the power supply time of the secondary battery during peak hours, avoid the rapid depletion of the power energy of the secondary battery during peak hours, reduces the burden of the mains electricity during peak hours, and saves electricity costs during peak hours.
2. The stability of the microgrid constructed by the hybrid power supply system can be improved in cooperation with the green energy C.
3. During peak hours, according to the power consumption of the load and the amount of stored power energy in the secondary battery, the available power supply time of the secondary battery can be known. According to the power supply time of the secondary battery, the silicon-controlled rectifier controls the conversion ratio to output a rectified direct current. The rectified direct current further outputs a simulated green energy, namely, the first direct current, via the AC/DC converter. That is to say, when the power supply time of the secondary battery is longer, simulated green energy with lower electric energy is output; when the power supply time of the secondary battery is shorter, simulated green energy with higher electric energy is output. By outputting simulated green energy of appropriate intensity, the power energy stored in the secondary battery can be utilized efficiently. Because the power energy stored in the secondary battery usually comes from the mains electricity during off-peak hours or real green energy, the variable-intensity simulated green energy in cooperation with the secondary battery can reduce the consumption of the main electricity during peak hours effectively, such that the electricity stored during off-peak hours can be used for a longer period of time during peak hours to achieve the function of peak-load shifting.

BRIEF DESCRIPTION OF THE DRAWINGS

FIG. 5 is a functional block diagram of a third embodiment of the present invention;

FIG. 6 is a functional block diagram of a fourth embodiment of the present invention;

DETAILED DESCRIPTION OF THE PREFERRED EMBODIMENTS

Embodiments of the present invention will now be described, by way of example only, with reference to the accompanying drawings.

Figure 1:
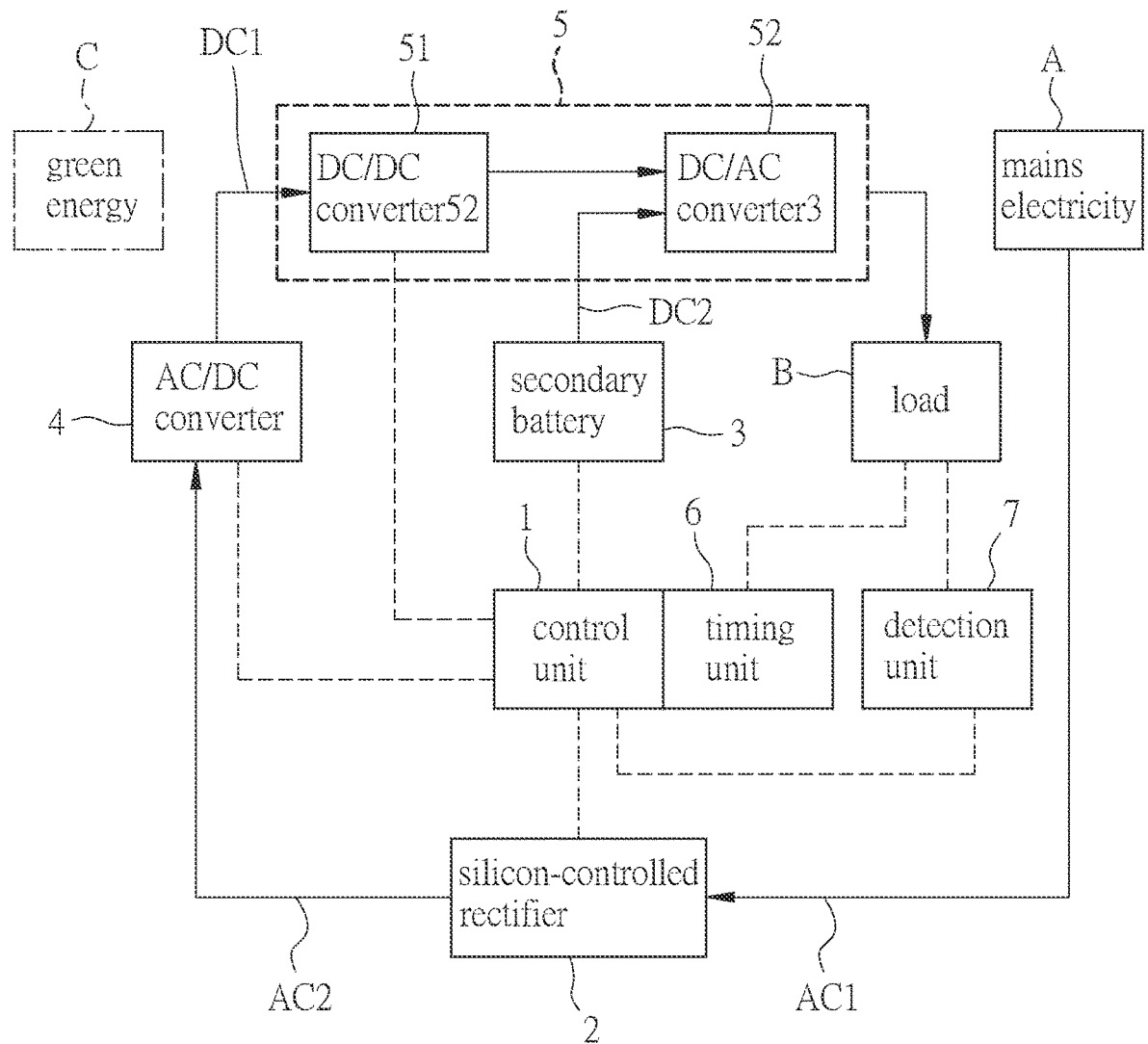
FIG. 1 is a functional block diagram of a first embodiment of the present invention.
Figure 2:
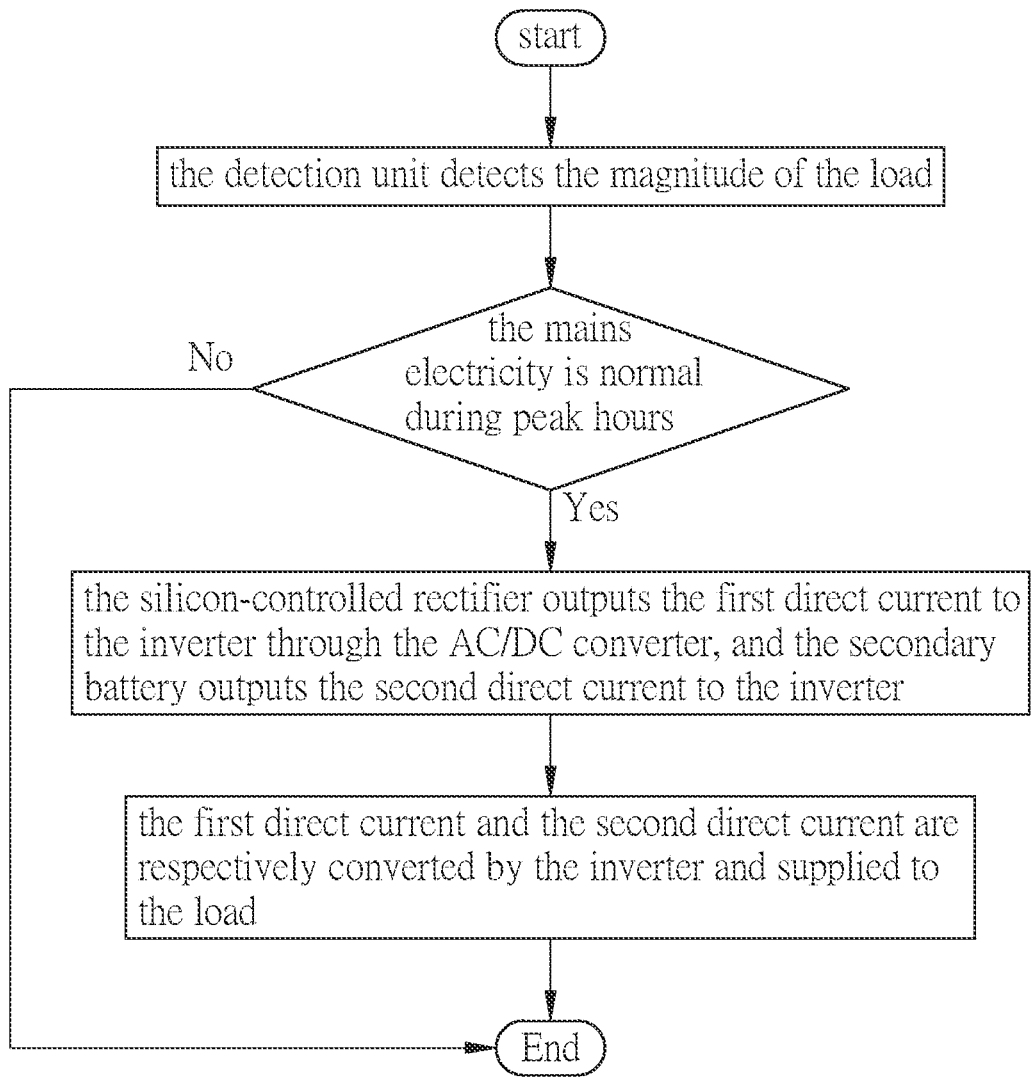
FIG. 2 is a flow block diagram of the first embodiment of the present invention.

As shown in FIG. 1 and FIG. 2, the present invention discloses a hybrid power supply system. The hybrid power supply system is used for performing a method of extending the power supply time of a secondary battery in the hybrid power supply system of the present invention, or it may be used as a computer program, or a computer-readable medium having the computer program. After being loaded into a computer, the computer program performs the method of extending the power supply time of the secondary battery in the hybrid power supply system.

In the following embodiments, the same components use the same component symbols, which can be regarded as implementations of the same embodiment at different time points, such as daytime and nighttime.

In order to indicate the conditions that specific components are not used or are abnormal, specific components are represented by imaginary lines or dotted lines in the drawings. Those with ordinary skill in the art can understand, based on the embodiments and drawings of the present invention, that the specific components represented by imaginary lines or dotted lines in each embodiment are actually used normally, absent, are not used, or are abnormal, etc.

The hybrid power supply system comprises a control unit 1, a silicon-controlled rectifier 2, a secondary battery 3, an AC/DC converter 4, an inverter 5, a timing unit 6, and a detection unit 7.

The control unit 1 is, for example, a programmable logic controller (PLC).

The silicon-controlled rectifier 2 is in signal communication with the control unit 1. The silicon-controlled rectifier 2 is electrically connected to a mains electricity A.

The secondary battery 3 is in signal communication with the control unit 1.

The AC/DC converter 4 is in signal communication with the control unit 1. The AC/DC converter 4 is electrically connected to the silicon-controlled rectifier 2.

The inverter 5 is in signal communication with the control unit 1. The inverter 5 is electrically connected to the AC/DC converter 4, the secondary battery 3, a load B and a green energy C. The inverter 5 is electrically connected to the green energy C as shown in FIG. 6. The green energy C is, for example, solar energy or wind energy.

In more detail, the inverter 5 includes a DC/DC converter 51 and a DC/AC converter 52. One end of the DC/DC converter 51 is electrically connected to the AC/DC converter 4 and the green energy C. One end of the DC/AC converter 52 is electrically connected to the other end of the DC/DC converter 51 and the secondary battery 3. The other end of the DC/AC converter 52 is electrically connected to the load B.

The timing unit 6 is in signal communication with the control unit 1.

The detection unit 7 is in signal communication with the control unit 1.

The timing unit 6 and the detection unit 7 are an independent timer and a detector. When the control unit 1 is a PLC, the timing unit 6 and the detection unit 7 may be the functions on the PLC. The detection unit 7 may be a current detector or the like for detecting the magnitude of the load B by means of current, but not limited thereto.

Figure 3:
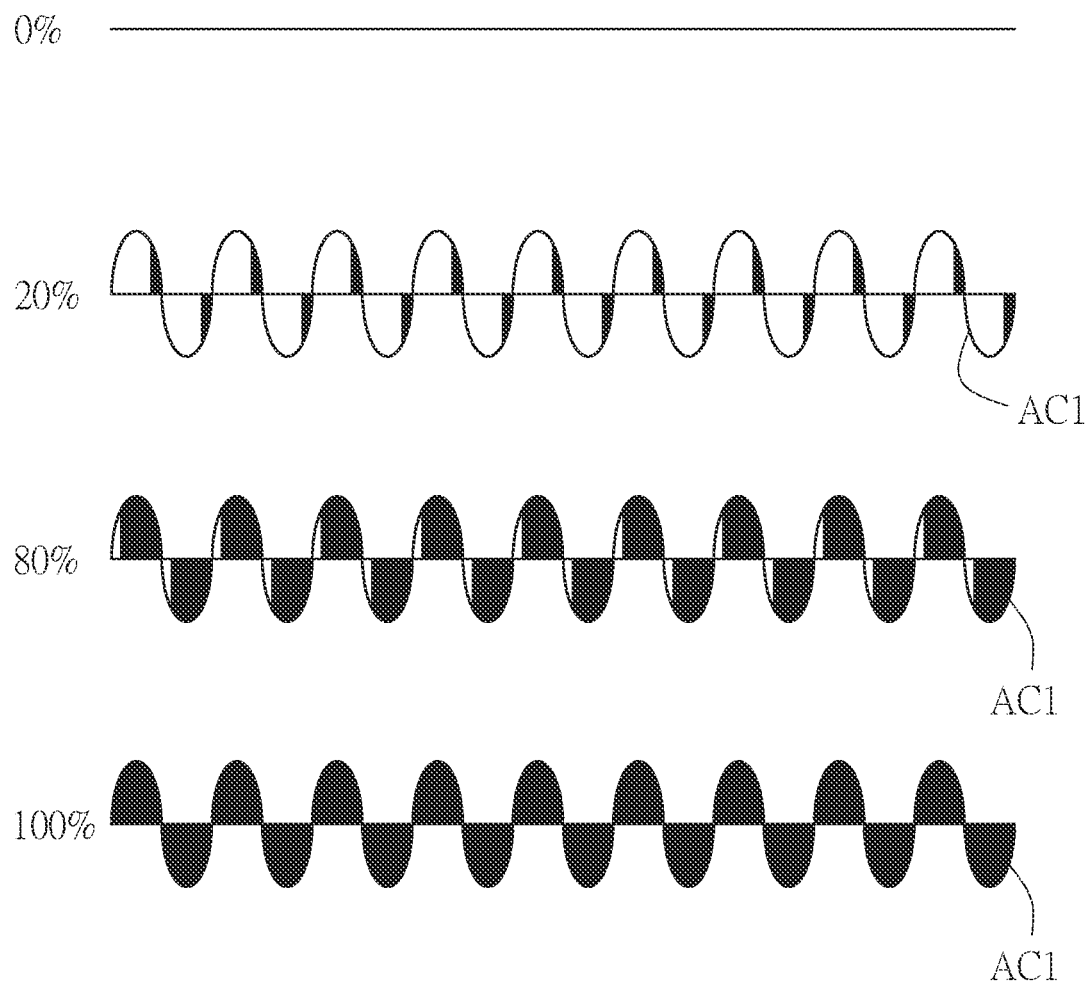
FIG. 3 is a schematic diagram of the first embodiment of the present invention, illustrating the relationship between the initial alternating current and the rectified alternating current with different conversion ratios.

Referring to FIG. 1 to FIG. 3, when performing the method of extending the power supply time of the secondary battery in the hybrid power supply system, the detection unit 7 first detects the magnitude of the load B and outputs it to the control unit 1.

Assuming that the green energy C is not provided, an initial alternating current AC1 from the mains electricity A will be input to the silicon-controlled rectifier 2 when the mains electricity A is normal during peak hours, the silicon-controlled rectifier 2 outputs a rectified alternating current AC2 to the AC/DC converter 4, and then the AC/DC converter 4 outputs a first direct current DC1 to the inverter 5.

The control unit 1 controls the secondary battery 3 to output a second direct current DC2 to the inverter 5 during a power supply time according to the magnitude of the load B.

The peak hours and relative off-peak hours may be determined according to the area in which the hybrid power supply system is located. For example, daytime may be defined as the peak hours when electricity consumption is relatively high, and nighttime may be defined the off-peak hours when electricity consumption is relatively low, but not limited thereto.

If the green energy C is solar energy, it may be regarded as not having the green energy C when there is no sunlight, such as on rainy days or at night.

Through the triggering of the silicon-controlled rectifier 2, the output of the initial alternating current AC1 can be changed. The continuous waveform in FIG. 3 represents the initial alternating current AC1. The blackened area in the continuous waveform represents the rectified alternating current AC2 (not marked in FIG. 3) formed by the triggering of the silicon-controlled rectifier 2. The ratio between an average voltage of a work cycle of the rectified alternating current AC2 and an average voltage of a work cycle of the initial alternating current AC1 is defined as a conversion ratio. The conversion ratio varies with the triggering time of the silicon-controlled rectifier 2. The control unit 1 controls the conversion ratio between 0% and 100% depending on the magnitude of the load B and the storage capacity of the secondary battery 3.

In this embodiment, the power supply time may be replaced by a designated power supply time. The control unit 1 calculates the designated power supply time via the timing unit 6 and controls the secondary battery 3 to output the second direct current DC2 during the designated power supply time, for example, 2 hours. The designated power supply time may be the entire peak hours, etc. The control unit 1 controls the conversion ratio according to the designated power supply time and the magnitude of the load B.

For example, when the designated power supply time is longer, the control unit 1 controls the conversion ratio to increase to, for example, 80%, such that the amount of power supplied by the secondary battery 3 per unit time is reduced, thereby extending the power supply time of the secondary battery 3 to the designated power supply time, preventing the secondary battery 3 from being exhausted during the peak hours and reducing the burden of the mains electricity A during the peak hours.

The first direct current DC1 output to the inverter 5 will be converted by the AC/DC converter 4, the DC/DC converter 51 and the DC/AC converter 52 in sequence and then supplied to the load B by the inverter 5. The second direct current DC2 will be converted by the DC/AC converter 52 and then supplied to the load B by the inverter 5.

In actual current detection, if the current of the first direct current DC1 is 4.6 amperes, the current of the second direct current DC2 supplied by the secondary battery 3 is also 4.6 amperes. According to the method of the present invention, the inverter 5 can indeed supply electricity with a current of 9.2 amperes to the load B. That is, when the green energy C is not provided or the green energy C is not in operation, the first direct current DC1 may indeed be used as simulated green energy to extend the power supply time of the secondary battery 3.

Figure 4:
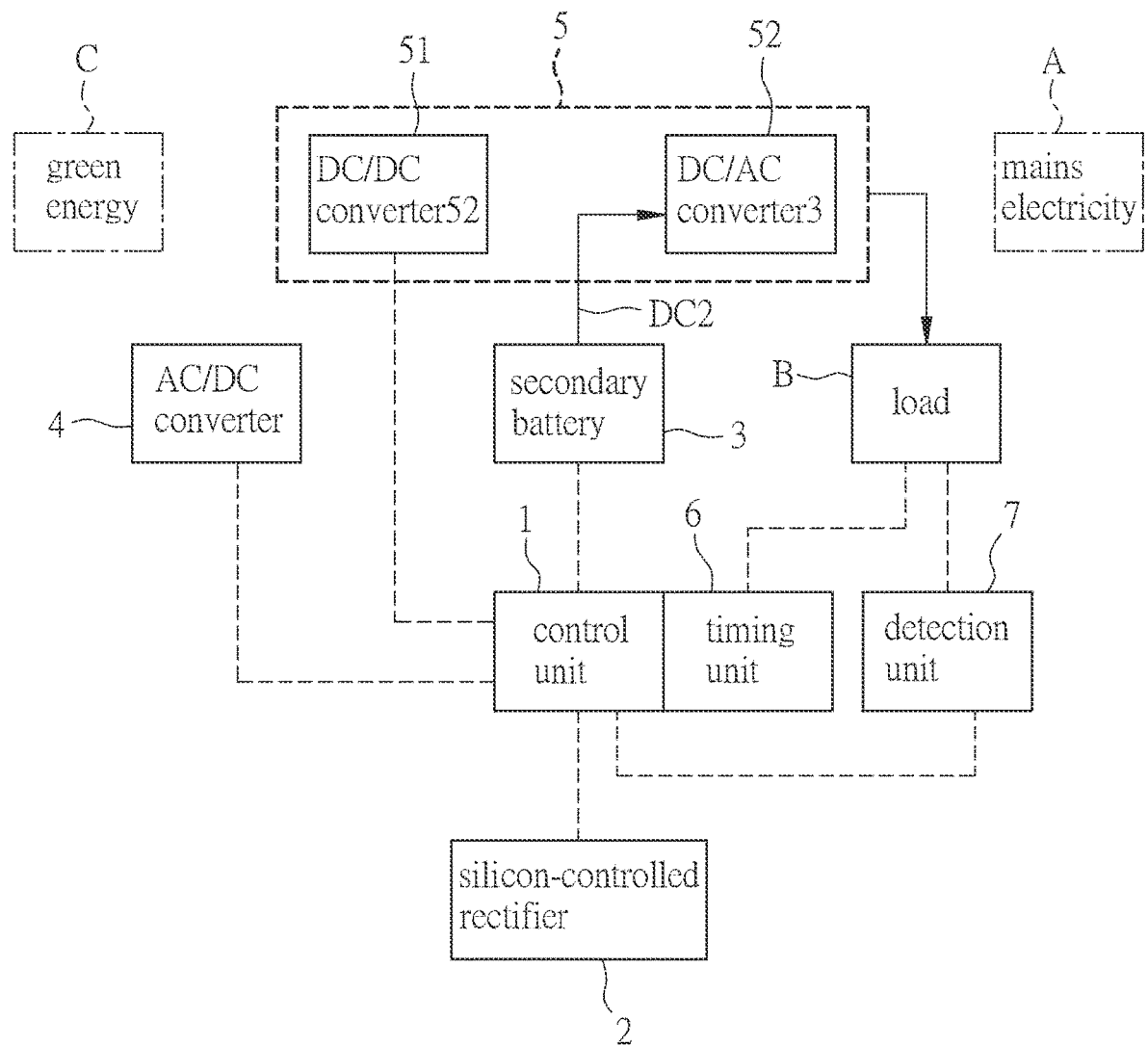
FIG. 4 is a functional block diagram of a second embodiment of the present invention.

Referring to FIG. 4, it is assumed that the green energy C is not provided. When the mains electricity A is abnormal, for example, when the mains electricity A has a power outage, the mains electricity A does not output the initial alternating current AC1 shown in FIG. 1. Similarly, there will be no the first direct current DC1 and the rectified alternating current AC2 shown in FIG. 1.

The control unit 1 controls the secondary battery 3 to output the second direct current DC2 to the inverter 5 during the power supply time according to the magnitude of the load B. The second direct current DC2 is converted by the DC/AC converter 52 of the inverter 5 and supplied to the load B.

Referring to FIG. 5, it is assumed that the green energy C is not provided. When the inverter 5 is abnormal, for example, the inverter 5 is damaged, the mains electricity A directly supplies the initial alternating current AC1 to the load B in a bypass manner.

At this time, there is no the first direct current DC1 and the rectified alternating current AC2 shown in FIG. 1, and the secondary battery 3 does not output the second direct current DC2 shown in FIG. 1.

Referring to FIG. 6, a smaller first threshold and a larger second threshold are defined. It is assumed that the green energy C is provided. When a green energy direct current DC3 output by the green energy C exceeds the second threshold, the green energy C outputs the green energy direct current DC3 to the inverter 5. The green energy direct current DC3 is converted by the inverter 5 and supplied to the load B and the secondary battery 3.

At this time, the mains electricity A does not need to be actuated, and there is no the initial alternating current AC1, the first direct current DC1, and the rectified alternating current AC2 shown in FIG. 1. The secondary battery 3 does not output the second direct current DC2 shown in FIG. 1.

Figure 7:
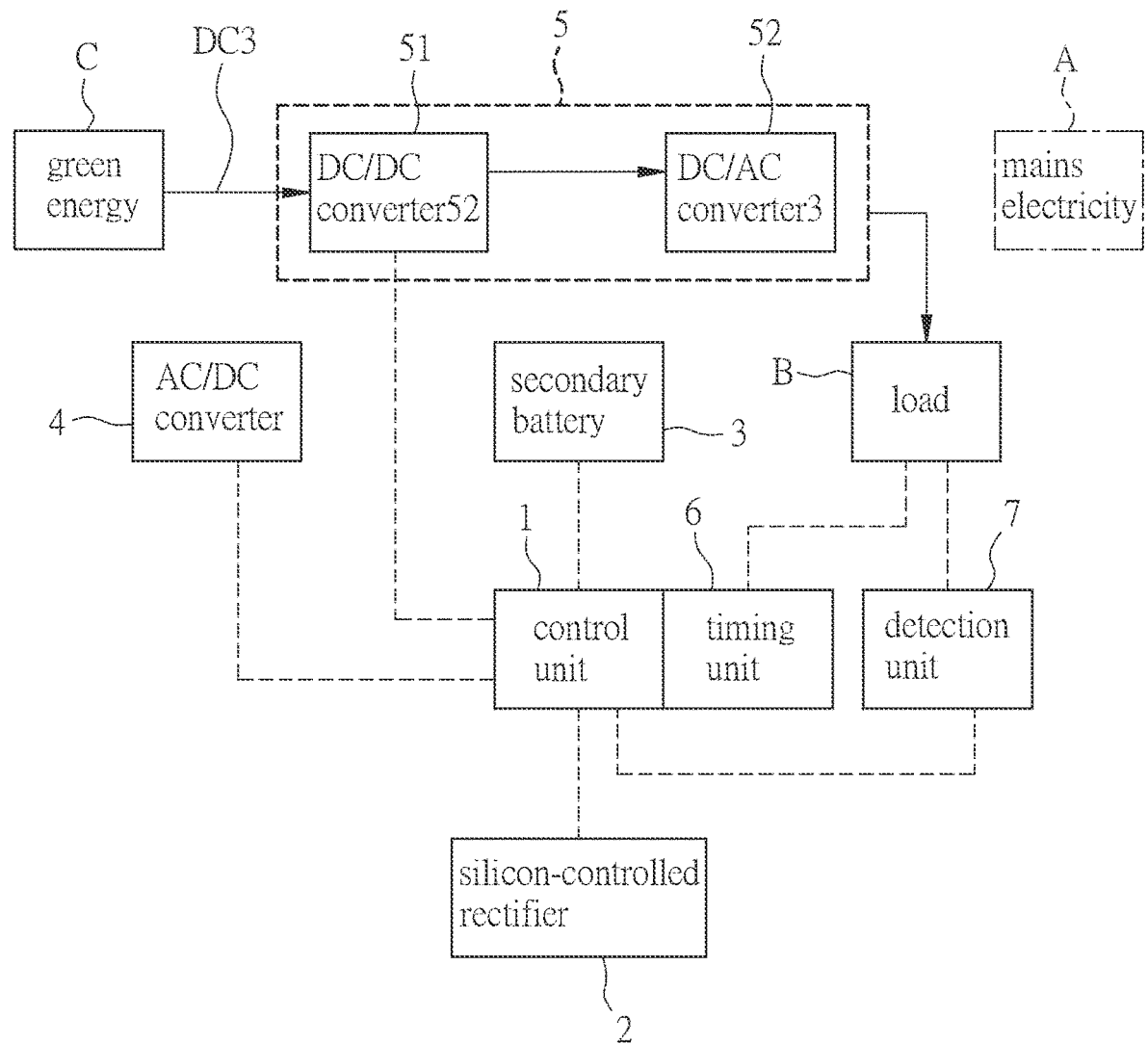
FIG. 7 is a functional block diagram of a fifth embodiment of the present invention.

Referring to FIG. 7, it is assumed that the green energy C is provided. When the green energy direct current DC3 output by the green energy C exceeds the first threshold but does not exceed the second threshold, the green energy C outputs the green energy direct current DC3 to the inverter 5. The green energy direct current DC3 is converted by the inverter 5 and supplied to the load B, but not to the secondary battery 3.

At this time, the mains electricity A does not need to be actuated, and there is no the initial alternating current AC1, the first direct current DC1, and the rectified alternating current AC2 shown in FIG. 1. The secondary battery 3 does not output the second direct current DC2 shown in FIG. 1.

Figure 8:
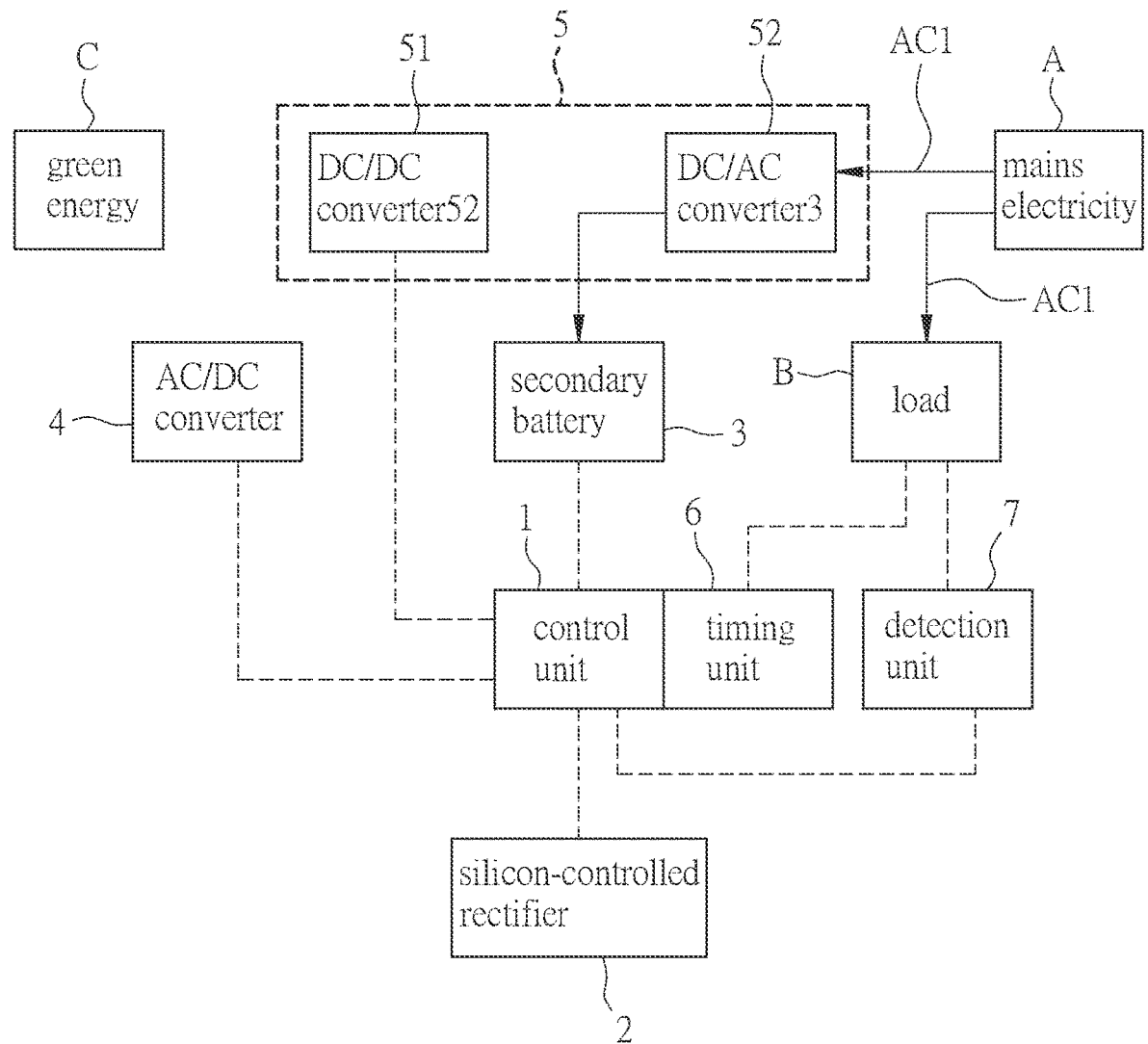
FIG. 8 is a functional block diagram of a sixth embodiment of the present invention.

Please refer to FIG. 8. During the off-peak hours, no matter whether the green energy C is provided or not, the mains electricity A outputs the initial alternating current AC1 to the inverter 5. The initial alternating current AC1 is converted by the inverter 5 and supplied to the secondary battery 3, and the initial alternating current AC1 of the mains electricity A is directly supplied to the load B.

At this time, there is no the first direct current DC1 and the rectified alternating current AC2 shown in FIG. 1. The secondary battery 3 does not output the second direct current DC2 shown in FIG. 1.

Please refer to FIG. 1 again. Depending on whether it is during the peak hours or the off-peak hours and whether components such as the mains electricity A and the inverter 5 are normal or not, the hybrid power supply system will have different power supply modes to ensure that power is supplied to the load B at all times, and that the secondary battery is recharged in a timely manner.

The stability of the microgrid constructed by the hybrid power supply system can be improved in cooperation with the green energy C.

The control unit 1 controls the conversion ratio through the silicon-controlled rectifier 2 to extend the power supply time of the secondary battery 3.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for extending a power supply time of a secondary battery in a hybrid power supply system, comprising:
   a detection unit detecting the magnitude of a load and outputting it to a control unit;
   wherein when a mains electricity is normal during peak hours, an initial alternating current from the mains electricity is input to a silicon-controlled rectifier, the silicon-controlled rectifier outputs a rectified alternating current to a AC/DC converter, and then the AC/DC converter outputs a first direct current to an inverter, the ratio between an average voltage of a work cycle of the rectified alternating current and an average voltage of a work cycle of the initial alternating current is defined as a conversion ratio, the control unit controls the conversion ratio between 0% and 100% depending on the magnitude of the load;
   the control unit controlling a secondary battery to output a second direct current to the inverter during a power supply time according to the magnitude of the load;
   the first direct current and the second direct current being respectively converted by the inverter and supplied to the load.

2. The method as claimed in claim 1, wherein when the mains electricity is abnormal, the mains electricity does not output the initial alternating current, the control unit controls the secondary battery to output the second direct current to the inverter during the power supply time according to the magnitude of the load, and the second direct current is converted by the inverter and supplied to the load.

3. The method as claimed in claim 1, wherein when the inverter is abnormal, the initial alternating current of the mains electricity is directly supplied to the load.

4. The method as claimed in claim 1, wherein a green energy is provided, the green energy outputs a green energy direct current to the inverter, and the green energy direct current is converted by the inverter and supplied to the load.

5. The method as claimed in claim 4, wherein the green energy outputs the green energy direct current to the inverter, and the green energy direct current is converted by the inverter and supplied to the load and the secondary battery.

6. The method as claimed in claim 1, wherein during off-peak hours, the mains electricity outputs the initial alternating current to the inverter, the initial alternating current is converted by the inverter and supplied to the secondary battery, and the initial alternating current of the mains electricity is directly supplied to the load.

7. The method as claimed in claim 1, wherein a timing unit is in signal communication with the control unit; the control unit calculates a designated power supply time via the timing unit and controls the secondary battery to output the second direct current during the designated power supply time, and the control unit controls the conversion ratio according to the designated power supply time and the magnitude of the load.

8. The method as claimed in claim 1, wherein the inverter includes a DC/DC converter and a DC/AC converter, the first direct current is supplied to the load after being converted by the AC/DC converter, the DC/DC converter and the DC/AC converter; the second direct current is converted by the DC/AC converter and then supplied to the load.

9. A hybrid power supply system, comprising:
   a control unit;
   a secondary battery, being in signal communication with the control unit;
   a silicon-controlled rectifier, being in signal communication with the control unit;
   an AC/DC converter, being in signal communication with the control unit, the AC/DC converter being electrically connected to the silicon-controlled rectifier;
   an inverter, being in signal communication with the control unit, the inverter being electrically connected to the AC/DC converter and the secondary battery; and
   a detection unit, being in signal communication with the control unit, the detection unit detecting the magnitude of a load and outputting it to the control unit;
   wherein when a mains electricity is normal during peak hours, an initial alternating current from the mains electricity is input to the silicon-controlled rectifier, the silicon-controlled rectifier outputs a rectified alternating current to the AC/DC converter, and then the AC/DC converter outputs a first direct current to the inverter, the ratio between an average voltage of a work cycle of the rectified alternating current and an average voltage of a work cycle of the initial alternating current is defined as a conversion ratio, the control unit controls the conversion ratio between 0% and 100% depending on the magnitude of the load;
   wherein the control unit controls the secondary battery to output a second direct current to the inverter during a power supply time according to the magnitude of the load;
   wherein the first direct current and the second direct current are respectively converted by the inverter and supplied to the load.

* * * * *